United States Patent
Engels

(10) Patent No.: US 7,143,520 B2
(45) Date of Patent: Dec. 5, 2006

(54) ALIGNMENT STRUCTURE

(75) Inventor: Geoffrey P. Engels, Warner Robins, GA (US)

(73) Assignee: Arinc Incorporated, Annapolis, MD (US)

(*) Notice: Subject to any disclaimer, the term of this patent is extended or adjusted under 35 U.S.C. 154(b) by 320 days.

(21) Appl. No.: 10/825,294

(22) Filed: Apr. 16, 2004

(65) Prior Publication Data

US 2005/0231712 A1    Oct. 20, 2005

(51) Int. Cl.
G01B 11/26    (2006.01)

(52) U.S. Cl. .................................. 33/286; 33/DIG. 21

(58) Field of Classification Search .................. 33/228, 33/286, 412, 613, 645, DIG. 21, 281, 282, 33/285
See application file for complete search history.

(56) References Cited

U.S. PATENT DOCUMENTS

| | | | |
|---|---|---|---|
| 4,624,563 A | 11/1986 | Johnson | |
| 4,709,485 A * | 12/1987 | Bowman | ..................... 33/286 |
| 4,712,953 A | 12/1987 | Witzel et al. | |
| 4,764,010 A | 8/1988 | Bachmann et al. | |
| 4,867,560 A | 9/1989 | Kunitsugu | |
| 4,882,772 A | 11/1989 | Rist et al. | |
| 4,928,401 A | 5/1990 | Murray, Jr. | |
| 4,977,516 A | 12/1990 | Shepard | |
| 4,981,354 A | 1/1991 | DeHainaut et al. | |
| 4,984,173 A | 1/1991 | Imam et al. | |
| 4,999,506 A | 3/1991 | Mizusawa et al. | |
| 5,077,905 A | 1/1992 | Murray, Jr. | |
| 5,115,406 A | 5/1992 | Zatezalo et al. | |
| 5,148,232 A | 9/1992 | Duey et al. | |
| 5,244,052 A | 9/1993 | Yamaguchi | |
| 5,371,953 A * | 12/1994 | Nower et al. | ................. 33/645 |
| 5,430,539 A | 7/1995 | Lysen | |
| 5,450,245 A | 9/1995 | Grotzinger et al. | |
| 5,684,578 A | 11/1997 | Nower et al. | |
| 5,715,609 A | 2/1998 | Nower | |
| 5,877,854 A | 3/1999 | Shai et al. | |
| 6,031,613 A | 2/2000 | Washington | |
| 6,034,763 A | 3/2000 | Slater et al. | |
| 6,046,799 A | 4/2000 | Lysen | |
| 6,049,378 A | 4/2000 | Busch et al. | |
| 6,049,379 A | 4/2000 | Lucas | |
| 6,411,375 B1 | 6/2002 | Hinkle et al. | |
| 6,889,441 B1 * | 5/2005 | Seiffert | ........................ 33/286 |
| 6,915,582 B1 * | 7/2005 | Engels | ........................ 33/286 |

(Continued)

Primary Examiner—G. Bradley Bennett
(74) Attorney, Agent, or Firm—Oliff & Berridge, PLC

(57) ABSTRACT

Two (or more) components must be aligned to each other in the pitch, roll, and azimuth axes. One component is adjustable relative to the other non-adjustable component. The pitch and roll angles are measured with a high accuracy digital protractor. The readings are taken from fixed reference points on the non-adjustable and the adjustable components, and the position of the adjusting component is modified until the pitch and roll of the adjusting component matches the pitch and roll of the non-adjusting component. The azimuth angle is measured by using two line generating lasers, one that produces a visible azimuth axis on the non-adjustable component and the other which produces the visible azimuth axis on the adjustable component. The separation of the two lines is measured such that one measurement is in close proximity to the laser generators and the other is at a distance from the laser generators. The measurements are then compared and the position of the adjustable component is adjusted as required to make the measurements the same. This allows for alignment in the azimuth axis to be achieved with rapid and high degree of accuracy with minimal training and equipment.

14 Claims, 6 Drawing Sheets

U.S. PATENT DOCUMENTS

2005/0166411 A1* 8/2005 Scorvo ..................... 33/471

2005/0237516 A1* 10/2005 Lysen ........................ 33/286

* cited by examiner

ALIGNMENT STRUCTURE

BACKGROUND OF THE INVENTION

1. Field of Invention

This invention relates to systems and methods for facilitating the alignment of two pieces of machinery. More specifically, this invention relates to systems and methods for facilitating the alignment of two or more pieces of machinery so as to align each piece along the three dimensional axes.

2. Description of Related Art

It is well known that some machines must be aligned with other machines to ensure proper operation. For example, but not limited to, an aircraft equipped with a navigation unit must have the same pitch, roll and azimuth (yaw) as the aircraft itself to ensure proper and accurate navigation. Thus, there must be proper measurements to ensure that the unit has the same pitch, roll and azimuth as the aircraft. The pitch is the up/down movement, for example, of the nose of the aircraft. The roll is the up/down movement, for example, of the wings of the aircraft. The azimuth is the right/left movement, for example, of the nose of the aircraft.

Traditionally, alignment of machines in an aircraft, such as, a Terrain Following Radar, a Forward Looking Infra-Red System (FLIR) and an Inertial Navigation Unit (INU), generally utilize an optical method of alignment. This method aligns the axes of the aircraft, for example, a helicopter, and the equipment. However, the optical method of alignment does not produce a visible centerline for alignment, and the alignments are performed through sight measurements and estimations. Therefore, complex procedures are required to compensate for this problem.

A prior art device, such as a Theodolite, is used to determine the pitch, roll, and azimuth axes of the aircraft. It is also used to "sight in" the component that is to be aligned with the aircraft. This requires specially trained personnel, not only to operate the Theodolite, but to perform the mathematical calculations required to turn the Theodolite readings into proper adjustments of the component to be mounted so that it has the same pitch, roll, and azimuth as the aircraft. In modern systems, the Theodolite is attached to a computer which makes the calculations. Other units, such as Terrain Avoidance Radar and Forward Looking Infra-Red (FLIR) systems, use similar optical procedures. These procedures are time consuming and therefore expensive, not only in terms of equipment cost, but also in maintenance man-hours required, and aircraft "down time".

In addition, certain aircrafts have components that require alignment perpendicular to the line of flight. Such components are, for example, gunship targeting sensors and side looking radars. However, prior art devices perform alignments in the forward line of flight, rather than in the perpendicular line of flight, (i.e., oriented in the "look out" of the side of the aircraft).

Further, the optical method of alignment utilizes tabs to mark positions. The tabs are placed on the aircraft and the alignment is performed by moving the component until the component is aligned with the aircraft. However, this procedure is cumbersome and requires specialized equipments such as lasers tied to computers, and specially trained crews to operate it.

SUMMARY OF THE INVENTION

Accordingly, the invention provides systems and methods for facilitating the alignment of at least two pieces of machinery that is accurate, versatile, and can be performed without requiring specially trained personnel to operate.

One exemplary embodiment according to the systems and methods of the invention comprises attaching a first adapter on a non-adjusting component, placing a first line generator laser holder on the first adapter to produce a first visible line, attaching a second adapter on an adjusting component, and placing a second line generator laser holder on the second adapter for producing a second visible line, wherein the visible lines determine an angle of azimuth of the components.

Other exemplary embodiments of the systems and methods of the invention separately place a digital protractor on the adapters to determine the degree of pitch and roll of the components.

Other exemplary embodiments of the systems and methods of the invention separately measure the distance between the visible lines generated by the first and second laser holders so as to determine the azimuth by comparing the measurements of the laser holders.

In yet other exemplary embodiments of the systems and methods of the invention, the measurements between the distance of the visible lines occur near the line generator laser holders and at a distance farthest from the line generator laser holders.

Other exemplary embodiments of the systems and methods of the invention separately place the digital protractor on the second adapter to measure the pitch and roll of the adjusting component.

Other exemplary embodiments of the systems and methods of the invention separately adjust the adjusting component as required to make the reading on the adjustable piece of component match the reading of the non-adjustable piece of component.

In yet other exemplary embodiments of the systems and methods of the invention, the adapter includes grooves for the digital protractor and a precision slot for the line generator laser holders.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of the systems and methods according to this invention will be described in detail with reference to the following figures, wherein.

DETAILED DESCRIPTION OF PREFERRED EMBODIMENTS

The invention facilitates the alignment of two (or more) components that must be aligned along the three dimensions axes. For example, pitch, roll, and azimuth axes of an installed component must be aligned with the pitch, roll, and azimuth axes of a vehicle, such as, but not limited to, an aircraft. The pitch and roll angles are measured with a high accuracy digital protractor that can be mounted in one of two positions oriented at 90° to each other. The readings are taken from fixed reference points on the non-adjustable component and the adjustable component. The azimuth angle is measured by using two line generating lasers (e.g., a light generating source that generates a line rather than a spot). For example, one line generating laser produces a visible azimuth axis on the non-adjustable component and the other produces the visible azimuth axis on the adjustable component. The separation of the two lines is measured such that one measurement is in close proximity to the laser generators and the other is at a distance. The measurements are then compared and the adjustable component is adjusted as required to make the reading on the adjustable component match the reading of the non-adjustable component. This allows the alignment of the azimuth axis to be determined with rapid and high degree of accuracy with minimal training and equipment.

Figure 1:
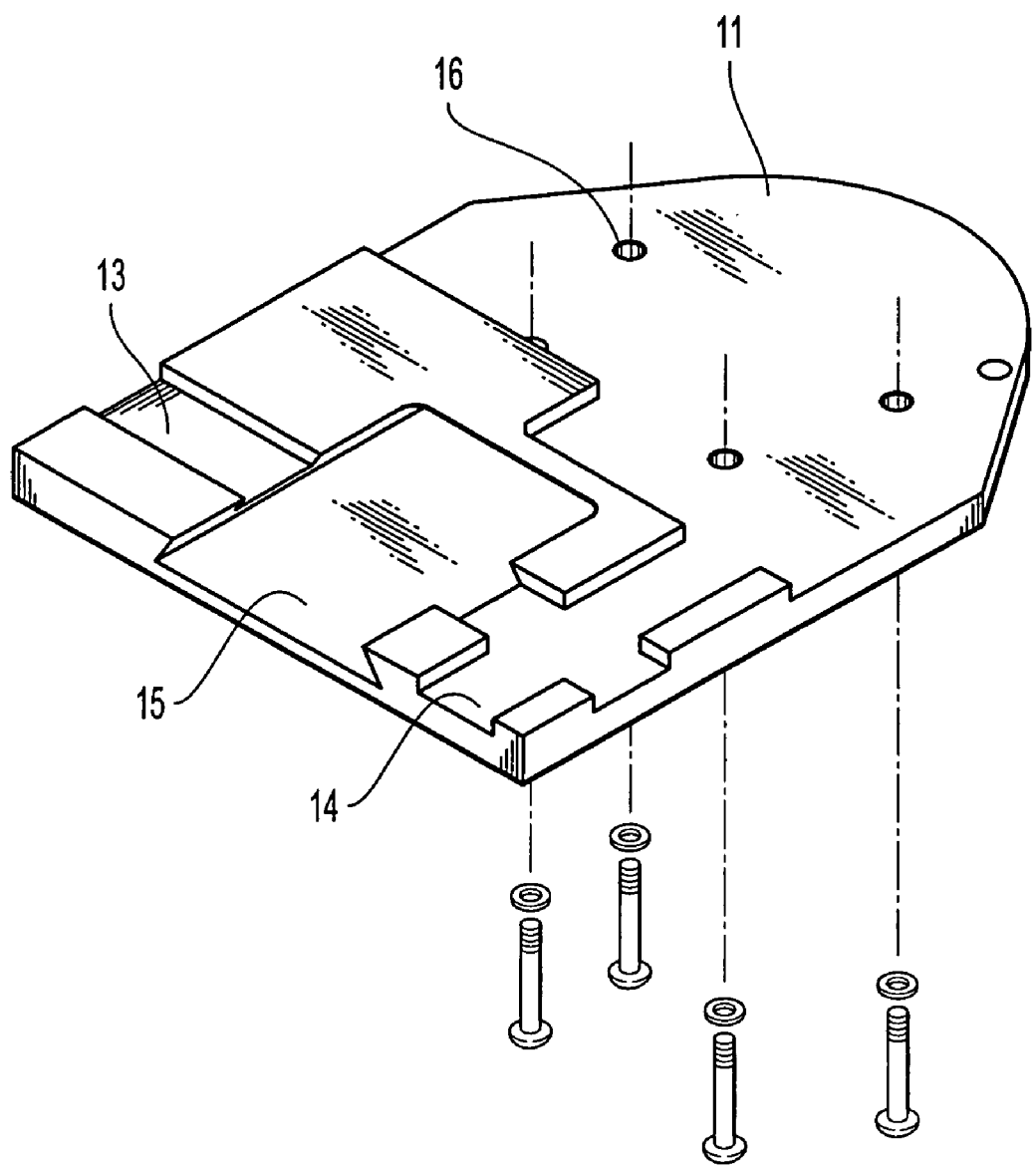
FIG. 1 illustrates one exemplary embodiment of an adapter for attaching to components.

FIG. 1 illustrates one exemplary embodiment of an adapter for attaching to non-adjustable and adjustable components. As an exemplary embodiment, the adapter 11 is shown to be specifically designed to fit the Terrain Avoidance Radar and the Forward Looking Intra-Red (FLIR) component on a helicopter. The adapter 11 is designed to attach to the non-adjusting component. On the base of the adapter 11 are holes 16 for connecting attachment means, (i.e., the screws and washers) to the non-adjustable component (i.e., aircraft). It should be appreciated that other attachment means, besides the screws and washers configuration, may be utilized for connecting the adapter to the non-adjusting component.

The adapter 11 has precision grooves 13, 14 for precisely positioning a digital protractor. The grooves 13, 14 are cut at precise 90 degree angles to each other so that the digital protractor can measure the pitch and roll. For example, depending on the orientation of the adapter 11 on the non-adjustable component, the groove 13 could be used to measure pitch and the groove 14 could be used to measure roll. These measurements, form the pitch and roll reference plane for the system.

The adapter 11 also has a precision slot 15 for fitting the line generating laser holder. The precision slot 15 is precisely oriented so that the generated line produced by the laser is the projected centerline of the non-adjustable component. This line forms the azimuth reference for the system.

It should also be appreciated that adapters of various designs may be used to attach the adapter to the equipment depending on the shape of the equipment. It also should be appreciated that other adapters that mate with other components may be used, when appropriate.

It should be appreciated that a second adapter 12 (FIG. 5) attached to an adjustable component can be designed to perform the same function as the first adapter 11 for the non-adjustable component. The second adapter 12 includes the same grooves 13, 14 and precision slot 15 as the first adapter 11.

Figure 2:
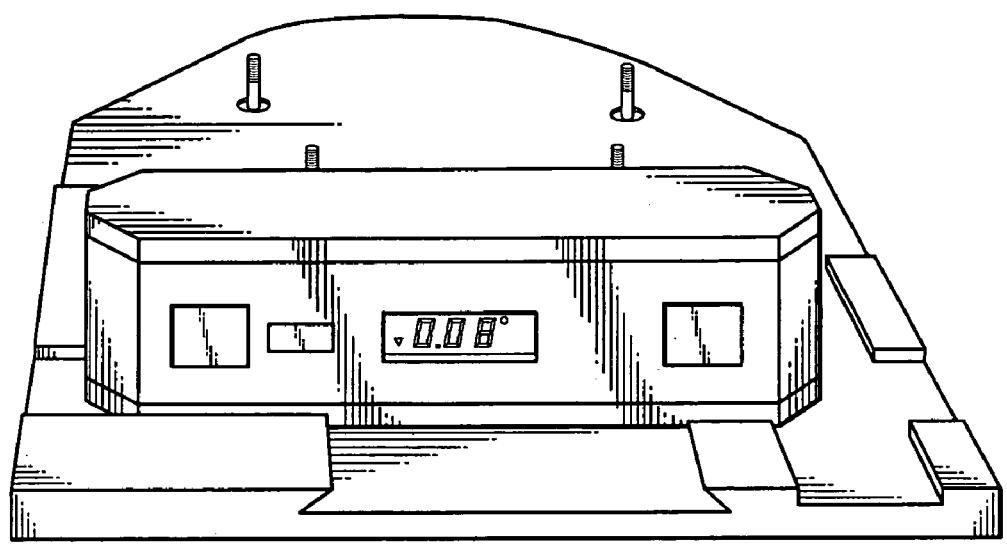
FIG. 2 illustrates one exemplary embodiment of a digital protractor attached to the adapter.

FIG. 2 illustrates one exemplary embodiment of a digital protractor attached to the groove 13 in the adapter. As an exemplary embodiment, the digital protractor is a Pro 3600 manufactured by Mitutoyo Corporation. The digital protractor is fitted into either one of the grooves 13, 14 to measure the angles of the pitch and roll. The digital protractor can measure the pitch and roll angles down to 0.01 degree.

Figure 3:
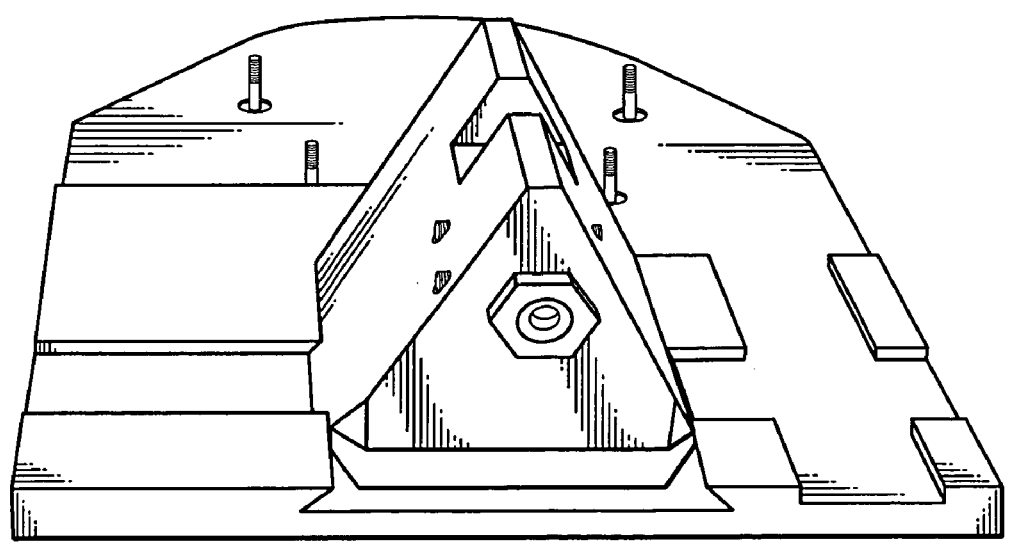
FIG. 3 illustrates one exemplary embodiment of a line generating laser holder attached to the adapter.

FIG. 3 illustrates one exemplary embodiment of a line generating laser holder attached to the adapter. The line generating laser holder is fitted in the precision slot 15 of the first adapter to measure the azimuth axis. The laser holder is precisely oriented so that the projected line can project an exact centerline or a line that is exactly 90 degrees to the centerline of the non-adjustable component. It should be appreciated that the precision slot 15 can be in different shapes to retain the line generating laser holder in all positions.

Figure 4:
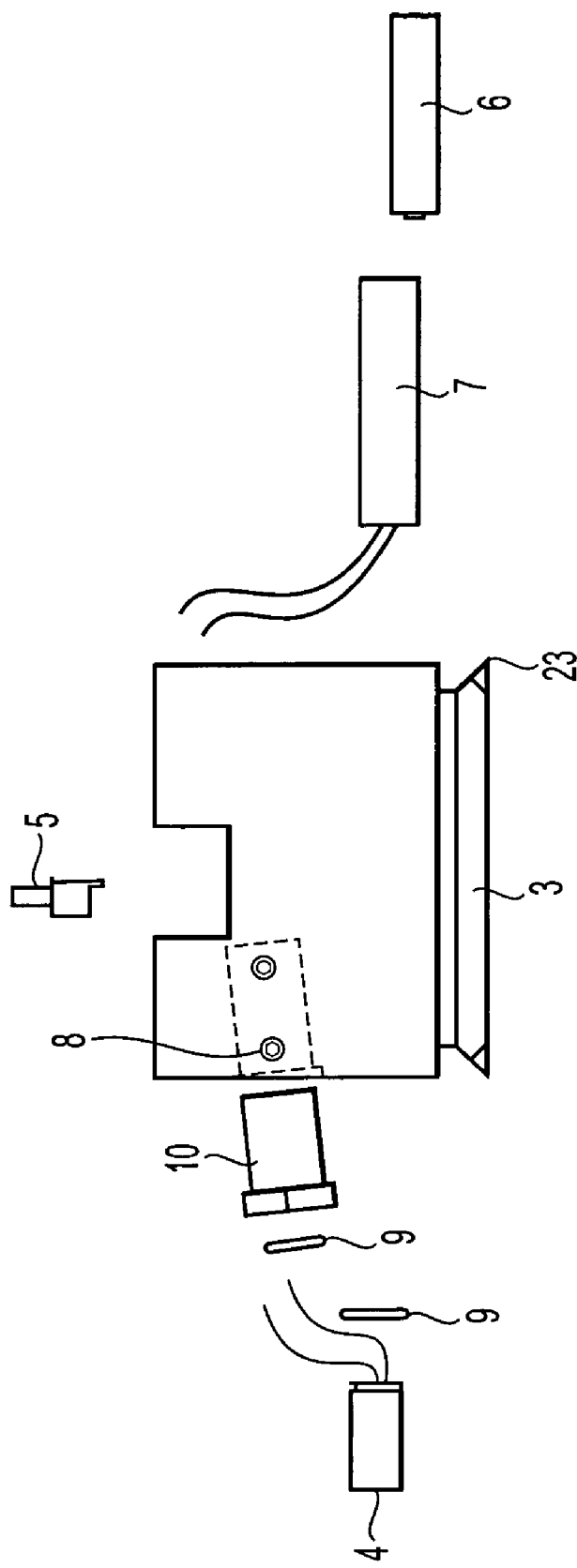
FIG. 4 is a schematic representation of the line generating laser holder in greater detail.

FIG. 4 is a schematic representation of the line generating laser holder in greater detail. As an exemplary embodiment, the line generating laser holder includes a holder block 3 for holding the components together, a laser module 4 for generating the light generator in a line, a switch 5 for turning the laser on and off, an energy source 6 (i.e., batteries) to generate power, a battery holder 7, an adjustment means 8 to allow calibration of the laser, O-rings 9 to secure the laser in a sleeve and provide shock absorption, a sleeve 10 to hold the laser and allow adjustment, and a "dovetail" base 23 to allow installation in the adapter. It should be appreciated that the base 23 can be installed in the adapter in all four positions (e.g., 45°, 90°, 135° and 180°) depending on the required direction of the laser holder.

As shown in the exemplary embodiment, the holder block 3 is shaped with a square base (when viewed from below) so that it fits with the precision slot 15 of the adapters. It should be appreciated that the holder block 3 may be in other shapes to accommodate the shape of the precision slot 15 so as to retain the laser holder in all positions. The laser holder is precisely oriented so that the laser module 4 can project an exact centerline or a line that is exactly 90 or 180 degrees to the centerline of the component.

Figure 5:
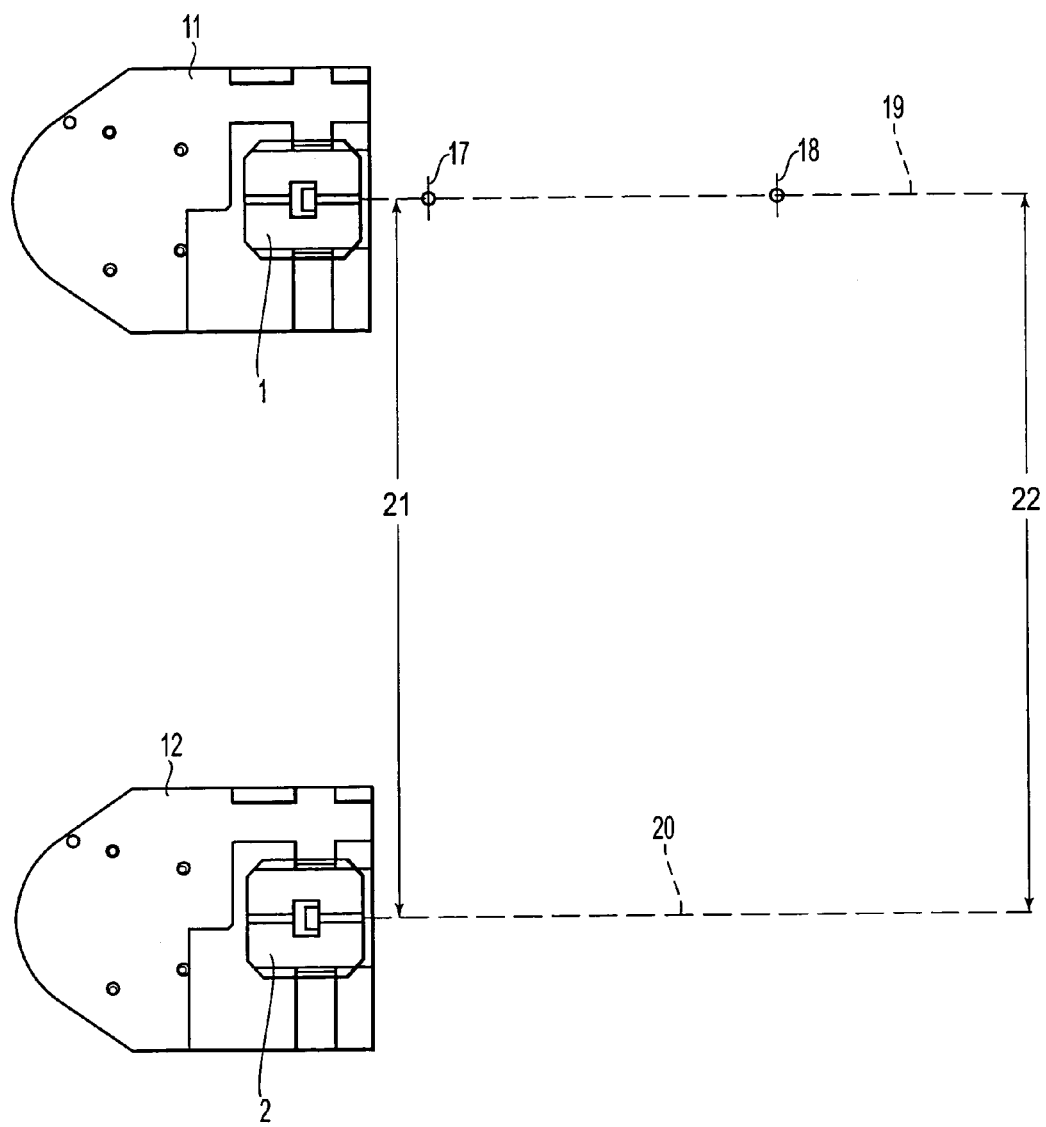
FIG. 5 illustrates one exemplary embodiment of the line generating laser holders in operation.

FIG. 5 illustrates one exemplary embodiment of the line generating laser holders in operation. As shown, a first line generating laser holder 1 is attached to a first adapter 11 and a second line generating laser holder 2 is attached to a second adapter 12. The first adapter 11 is attached to a non-adjusting component. The second adapter 12 is attached to an adjusting component. Each of the line generating laser holders 1, 2 produces a visible laser line 19, 20.

The azimuth axis is determined by installing a second laser holder into a second adapter mounted on the adjustable component. Turning on the laser line generator will project a centerline of the second laser holder and consequently the adjusting component. When the first and second laser line generators are mounted respectively in the first and second adapters and are turned on, a first measurement between the projected centerlines is taken as close as possible to the laser holders. A second measurement is then taken as far from the laser holders as possible. If the two measurements are the same, the lines are parallel and the components are aligned in the azimuth axis. If the measurements are different, the position of the adjustable component is adjusted as required to produce parallel lines. Accordingly, proper alignment is achieved when the measured distance is the same at both locations, (e.g., the lines are parallel). The longer the distance between the two measurements, the higher the degree of accuracy attained. For example, a difference of $\frac{1}{16}$ of an inch between the two lines at 30 feet distance produces an accuracy of ±0.01 degrees.

As shown in the exemplary embodiment, the pitch, roll, and azimuth of the non-adjusting component can be easily obtained. The pitch and roll readings may be measured by taking and recording them from appropriate locations on the non-adjusting component with a digital protractor. The digital protractor is placed on the adapter of the non-adjusting component and the measurement readings form two of the three basic references. The process is repeated at the adjusting component and the readings are compared. If the readings are the same (or within acceptable tolerance), no action is needed. If the readings show an unacceptable deviation, the adjusting component is adjusted to bring it into alignment.

The third basic reference (azimuth) may also be obtained for the non-adjusting component by utilizing the line generating laser holder. Because the azimuth axis is measured as the left/right movement of the nose of the aircraft, a digital protractor cannot be used. Thus, additional devices are needed to measure the azimuth axis. For example, plumb bobs dropped from two location on the center line may be utilized to define the azimuth axis. As an exemplary embodiment, plumb bobs are used by dropping plumb lines 17, 18 (FIG. 5) from two points on the centerline (or parallel to the centerline) of the non-adjusting component and using the first line generating laser holder 1 to shine on the tips of plumb bobs. This projects a laser line to define the azimuth of the non-adjusting component which is visible to the maintenance personnel as a line, normally on the floor of the hangar. This line will be considered the base reference with which to compare the position of the non-adjusting component.

It should be appreciated that on some non-adjusting components, existing reference points that are already aligned may be available. In this event, a specifically designed adapter can be built that simplifies taking pitch and roll measurements and establishing the azimuth line without the use of the plumb bobs.

To determine the pitch and roll angles of the adjusting component, a digital protractor is used to measure the pitch and roll of the adjusting component from an adapter that has been specifically designed to fit the component. The pitch and roll of the adjusting component are then adjusted as required to match the pitch and roll measurements of the non-adjusting component.

It should be appreciated that the pitch and roll of the adjusting component can be measured without the installation of an adapter if the adjusting component has a suitable surface measurement for the digital protractor.

To determine the azimuth angle of the adjusting component, a second adapter 12 is installed on the adjusting component to produce a laser line 20. Turning on the laser projects a centerline of the second line generating laser holder 2. The first line generating laser holder must also be turned on at this point. When both lasers holders 1, 2 are on, a first measurement 21 is taken as close as possible to the laser holders. A second measurement 22 is then taken as far from the laser holders 1, 2 as possible. If the two measurements 21, 22 are the same, the laser lines are parallel and the components are aligned. If the measurements are different, the position of the adjusting component is adjusted as required to produce parallel lines from the lasers.

In a various exemplary embodiment, if it is desired to have the adjusting component centerline at a specific angle, other than the same as the non-adjusting component, then trigonometry can be used to establish a distance between measurements and a difference in measurements which will produce the desired azimuth angle. The pitch and roll differences can be set by directly reading angles from a digital protractor.

Figure 6:
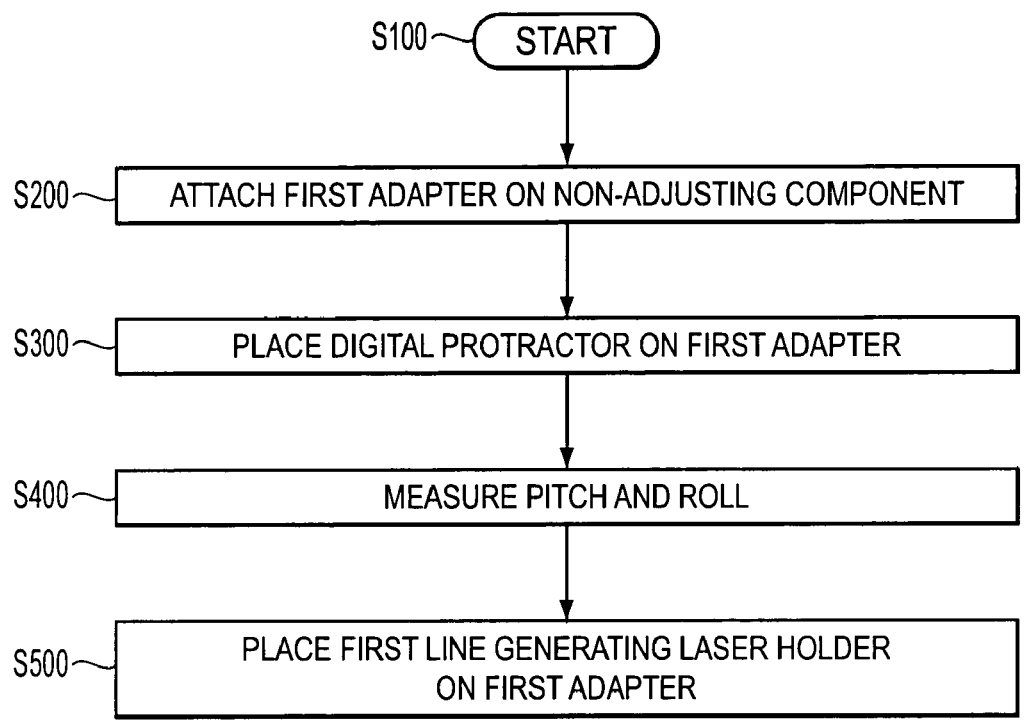
FIG. 6 is a flowchart illustrating the alignment process of the non-adjusting component according to the invention.

FIG. 6 is a flowchart illustrating the alignment process of the non-adjusting component according to the invention. In the exemplary embodiment shown, operation of the alignment process begins at step S100 and proceeds to step S200 where a first adapter is attached to a non-adjusting component. Next, in step S300, a digital protractor is placed on the first adapter to measure the pitch and roll angles in step S400. Then operation proceeds to step S500 by placing a first line generating laser holder on the first adapter to measure the azimuth angle.

Figure 7:
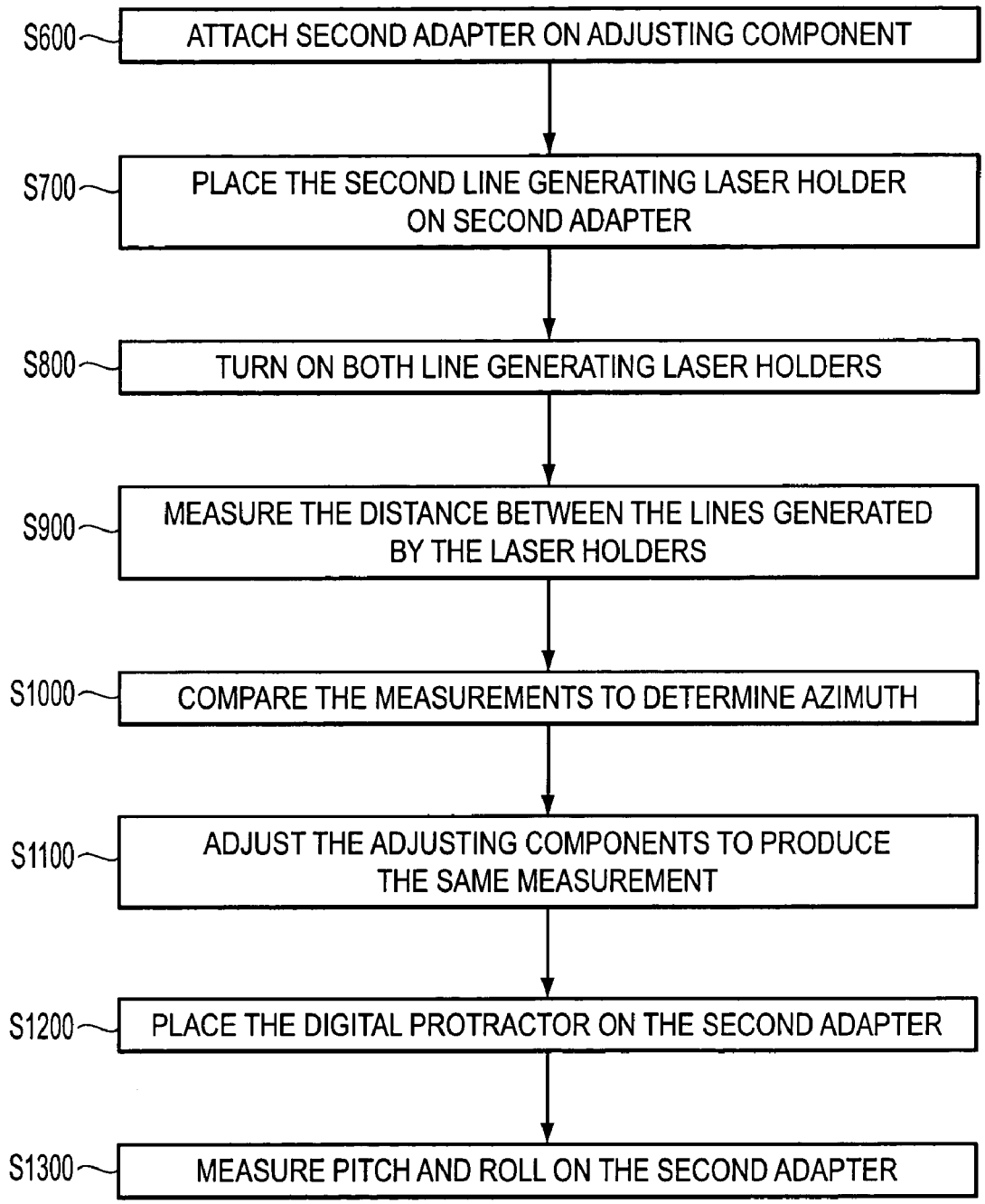
FIG. 7 is a flowchart illustrating the alignment process of the adjusting component according to the invention.

FIG. 7 is a flowchart illustrating the alignment process of the adjusting component according to the invention. In the exemplary embodiment shown, the alignment of the adjusting component begins in step S600 by attaching a second adapter on the adjusting component. Then, in step S700, a second line generation laser holder is installed on the second adapter to produce a second laser line. In step S800, both line generating laser holders are turned-on in the non-adjusting and adjusting components. Then operation proceeds to step S900 to measure the distance between the lines generated by the laser holders. The first measurement occurs at the distance closest to the laser holders and the second measurement occurs at the distance farthest from the laser holders. Next, in step S1000, the operation compares the measurements to determine the azimuth. If the measurements are not the same, step S1100 adjusts the position of the adjusting component to produce the same measurement. Then, in step S1200, a digital protractor is placed on the second adapter to measure the pitch and roll in step S1300. The measurement in the digital protractor for the adjusting component must correspond to the same measurement for the non-adjusting component to determine the pitch and roll.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made to the invention without departing from the spirit and scope thereof.

What is claimed is:

1. A method of aligning at least two components so that the components are aligned along at least one of three dimensional axes, comprising:

attaching a first adapter on a non-adjusting component;

placing a first line generator laser holder on the first adapter to produce a first visible line;

attaching a second adapter on an adjusting component; and placing a second line generator laser holder on the second adapter for producing a second visible line, wherein the visible lines determine an angle of azimuth of the components.

2. The method according to claim 1, further comprising:

placing a digital protractor in a first position on the first adapter;

placing the digital protractor in a second position on the first adapter, the second position being oriented perpendicular to the first position; and reading the digital protractor to determine angles of pitch and roll of the non-adjusting component.

3. The method according to claim 1, further comprising:
measuring distances between the visible lines generated by the first and second laser holders at first and second positions; and
comparing the measurements at the first and second positions to determine the azimuth.

4. The method according to claim 3, wherein the step of measuring the distances at the first and second positions occurs near the line generator laser holders and away from the line generator laser holders, respectively.

5. The method according to claim 3, further comprising adjusting the position of the adjusting component to produce the same measurements as the non-adjusting component.

6. The method according to claim 3, further comprising placing a digital protractor in a first position on the second adapter and in a second position on the second adapter that is perpendicular to the first position, to measure the pitch and roll of the adjusting component.

7. The method according to claim 6, further comprising:
comparing the measured pitch and roll of the adjusting component with the non-adjusting component; and
adjusting the position of the adjusting component until the measured pitch and roll of the adjusting component are the same as the non-adjusting component.

8. The method according to claim 2, wherein the first and second adapters each includes two perpendicular grooves for fitting the digital protractor.

9. The method according to claim 2, wherein the first and second adapters each includes a slot for fitting the corresponding line generator laser holder.

10. The method according to claim 9, wherein the laser line generator holder fitted in the slot can be rotated in increments of 90 degrees so as to measure the angles of the components that are perpendicular or opposite to a base reference line.

11. An alignment system for aligning adjustable and non-adjusting components along at least one of three dimensional axes, comprising:

a first adapter for attaching to the non-adjusting component, the first adapter having two perpendicular grooves and a slot;

a second adapter for attaching to the adjusting component, the second adapter having two perpendicular grooves and a slot that correspond in position to the grooves and slot in the first adapter;

a first laser line generator holder mountable in the slot of the first adapter for generating a first laser line;

a second laser line generator mountable in the slot of the second adapter for generating a second laser line to determine its parallelism to the first laser line; and a digital protractor mountable in the first and second grooves of the first and second adapters to measure pitch and roll of the non-adjusting and adjusting components.

12. The alignment system according to claim 11, wherein distances between the first and second laser lines generated by the first and second laser line generators are measured in two positions to determine an azimuth angle, wherein one position is near the laser holders and the other position is away from the laser holders.

13. The alignment system according to claim 12, wherein the position of the adjusting component is adjusted to produce the same pitch, roll, and azimuth angles as the non-adjusting component.

14. The alignment system according to claim 1, wherein the laser holders mountable in the slot of the adapters can be rotated in increments of 90 degrees so as to measure the angles of the components that are perpendicular or opposite to a base reference.

* * * * *